United States Patent [19]

Winterhoff

[11] Patent Number: 4,503,714
[45] Date of Patent: Mar. 12, 1985

[54] ARRANGEMENT FOR NON-CONTACTING MEASUREMENT OF STATIC AND DYNAMIC TORQUES

[75] Inventor: Horst Winterhoff, Dreieich, Fed. Rep. of Germany

[73] Assignee: Licentia Patent-Verwaltungs-GmbH, Frankfurt am Main, Fed. Rep. of Germany

[21] Appl. No.: 467,471

[22] Filed: Feb. 17, 1983

[30] Foreign Application Priority Data

Feb. 19, 1982 [DE] Fed. Rep. of Germany ....... 3206008

[51] Int. Cl.³ ............................................. G01L 3/10
[52] U.S. Cl. ............................ 73/862.36; 324/209
[58] Field of Search ............... 73/862.36, 779, DIG. 2, 73/862.08, 862.69; 324/209

[56] References Cited

U.S. PATENT DOCUMENTS

| | | | |
|---|---|---|---|
| 2,370,845 | 3/1945 | Davis | 73/779 X |
| 2,553,833 | 5/1951 | Rifenbergh | 73/862.36 |
| 2,557,393 | 6/1951 | Rifenbergh | 73/862.36 |
| 2,896,446 | 7/1959 | Lewis | 324/209 X |
| 3,866,462 | 2/1975 | Fraudin | 73/DIG. 2 X |
| 4,106,334 | 9/1978 | Studtmann | 324/209 X |

FOREIGN PATENT DOCUMENTS 3031997 3/1982 Fed. Rep. of Germany.

Primary Examiner—Charles A. Ruehl
Attorney, Agent, or Firm—Spencer & Frank

[57] ABSTRACT

A torque sensor is used for non-contacting measurement of torques in accordance with the eddy current principle. This sensor is arranged closely in front of the surface of the test object (shaft). The torque is determined on the basis of permeability changes in the surface of the test object material. There is a state of dependence between the measuring voltage and the distance of the torque sensor from the test object. As the distance increases, the measuring voltage decreases. The measuring voltage acquires a substantial distance independence by virtue of the exciting winding of the torque sensor forming with a capacitor a resonant oscillatory circuit tuned to the exciting frequency.

5 Claims, 4 Drawing Figures

ARRANGEMENT FOR NON-CONTACTING MEASUREMENT OF STATIC AND DYNAMIC TORQUES

BACKGROUND OF THE INVENTION

The invention relates to an arrangement for non-contacting measurement of static and dynamic torques, with a magnetic alternating field being produced on the surface of the test object, and the permeability change in the surface of the test object caused by the presence of the torque being determined by a pot-shaped magnetic yoke acting as a probe with four pole members located at the edge thereof, with their pole surfaces opposite the surface of the test object, and the pole members provided with measuring windings connected to form a magnetic bridge. Furthermore, at least one exciting winding is provided to reverse the magnitization of the test object to saturation. This measuring process and the measuring apparatus suited thereof are described in German Patent Application P 30 31 997.2-52.

For the magnetic excitation of the yoke there is provided, for example, at the center of the four pole members a further pole member provided with an exciting winding. The exciting winding is fed by an alternating voltage of suitable frequency which constitutes an exciting voltage. With such a magnetic yoke, and assuming a constant torque applied to the test object, such as a shaft, and given a constant amplitude of the exciting alternating voltage, the magnitude of the resulting measuring voltage decreases as the distance of the magnetic yoke from the test object increases.

SUMMARY OF THE INVENTION

It is an object of the invention to provide an arrangement for the non-contacting measurement of static and dynamic torques wherein, up to a certain change in the distance between the test object and the magnetic yoke a measuring voltage is obtained which is substantially independent of this change.

According to the invention there is provided an arrangement of the kind mentioned at the outset wherein the exciting winding and a capacitor associated therewith form a resonant oscillatory circuit tuned to the exciting frequency of the exciting alternating voltage signal.

The invention will now be explained using an embodiment depicted schematically in the accompanying drawings.

DESCRIPTION OF THE PREFERRED EMBODIMENTS

Figure 1:
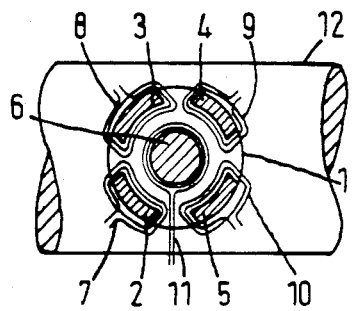
FIG. 1 shows a torque sensor applied to a test object (shaft) with measuring windings and an exciting winding in accordance with the invention.

As is apparent from FIG. 1, the torque sensor, which is illustrated in its actual size and which is applied to a shaft 12 comprises a soft magnetic (ferrite) pot core 1 with four yoke segments 2 to 5 and an inside core 6. The yoke segments 2 to 5 are provided with measuring windings 7 to 10 and the inside core 6 with an exciting winding 11. As is more clearly apparent from FIG. 2, the measuring windings 7 and 9 are arranged opposite one another on the yoke segments 2 and 4, are connected in series and have the same sense of winding. Similarly, measuring windings 8 and 10 are arranged opposite one another on yoke segments 3 and 5, are connected in series and have the same sense of winding. The winding pairs 7, 9 and 8, 10 are connected in opposition to one another in their sense of winding. The start A of the winding pair 7, 9, the end E of the winding pair 8, 10 and the connecting point M of both winding pairs 7, 9 and 8, 10 are connected to an electric balancing circuit 13 serving to compensate any asymmetry in the pot core 1 which can cause differing measuring voltages at the winding pairs. The output voltage of the balancing circuit 13 is supplied to a phase-selective rectifier 14 which is connected to an indicating device 15, for example, in the form of a recorder or the like.

The phase-selective rectifier 14 receives its control voltage from a high frequency generator 16 with a frequency of, for example, approximately 170 kHz. The generator 16 is also connected to a power amplifier 17 which supplies the alternating-current voltage for the exciting winding 11 of the torque sensor.

Figure 2:
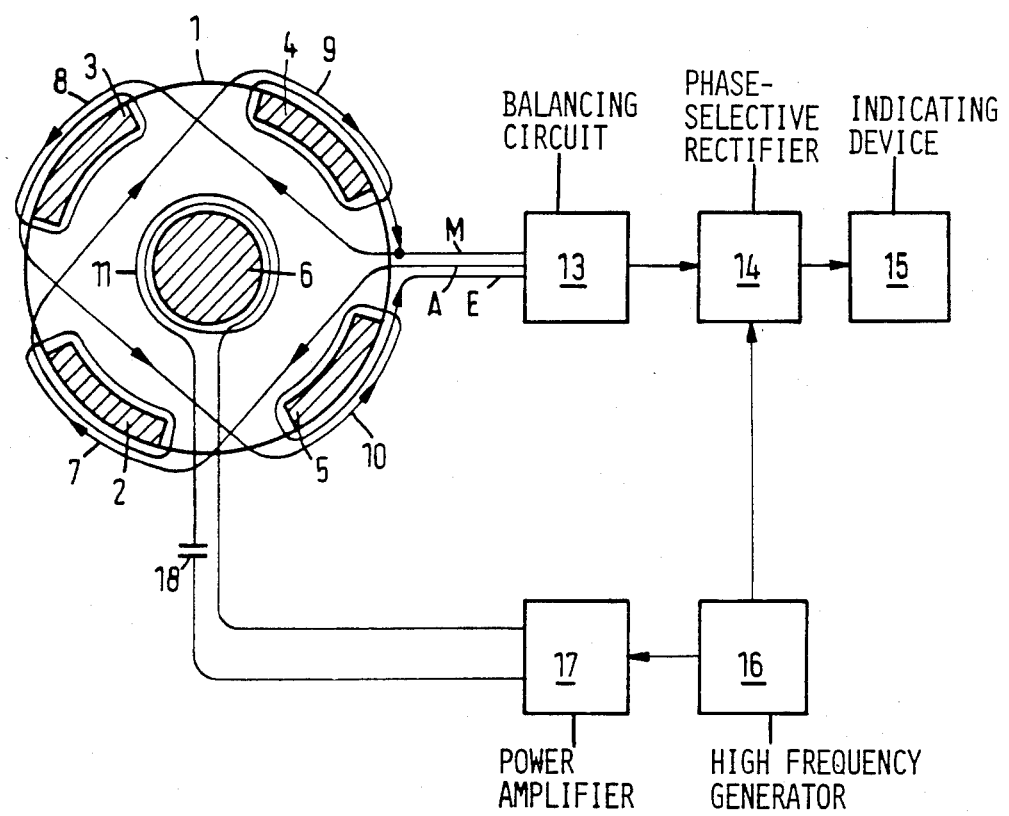
FIG. 2 shows the measuring windings of the torque sensor of FIG. 1 and an electronic measuring circuit connected thereto according to the invention.

As is further apparent from FIG. 2, a capacitor 18 is inserted in one line of the exciting winding 11 so as to form a series resonant circuit comprising the winding 11 and the capacitor 18.

The mode of operation will now be explained in detail.

The series resonant circuit constituted by the exciting winding 11 and the capacitor 18 is excited by the generator 16 through the amplifier 17 with a frequency of approximately 170 kHz.

With no torque at the test object (shaft 12, FIG. 1), the sum of the measuring voltages induced in the windings 7 and 9 is equal to the sum of the measuring voltages induced in the windings 8 and 10. Since the winding pairs 7, 9 and 8, 10 are connected in opposition to one another, the signal voltage after balancing is zero with respect to amplitude and phase.

If a torque is applied to the shaft 12, and the latter is thus subjected to torsion, tensile and shearing stresses occur at ±45° from the axial direction which go hand in hand with a permeability change at the surface of the shaft 12. In the direction of the tensile stress (+45°) the permeability increases, and in the direction of the shearing stress (−45°) the permeability decreases.

With a torque present at the test object, there occurs at the output of the rectifier 14, on account of the differing permeabilities of the shaft 12 in the ±45° directions, a signal voltage which is directly proportional to the torque.

In the case of a constant amplitude alternating voltage for the exciting winding 11, this signal voltage decreases as the distance of the torque sensor from the shaft 12 increases. With an increase in the distance of the shaft from the sensor, the exciting winding 11, is, however, also less damped, and the electrical quality (i.e. Q factor) of this winding 11 increases as the distance increases. Since this winding 11 is a component of series resonant circuit constituted by winding 11 and capacitor 18, the voltage across the winding 11 also increases with the increasing Q factor, so that the signal voltage through the resonant circuit comprising winding 11 and capacitor 18 decreases substantially less with the increasing shaft—sensor distance than if a constant exciting voltage were used for the winding 11.

Figure 3:
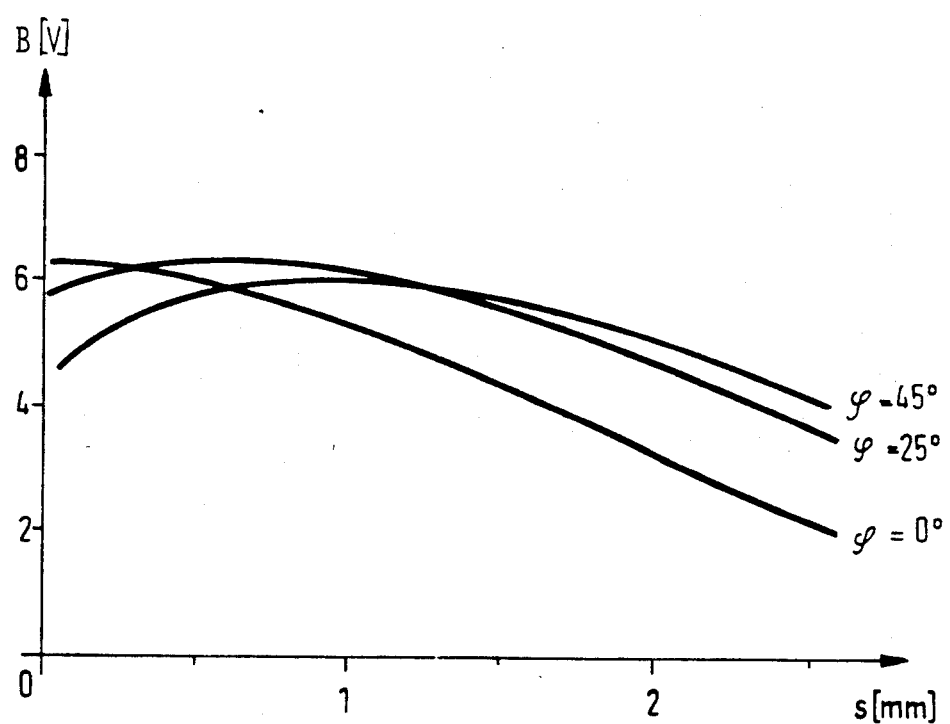
FIG. 3 shows a diagram of the measuring signal in dependence upon the change in the distance between the sensor and the test object as illustrated in FIG. 1.

FIG. 3 indicates the change in the signal voltage B at the output of phase rectifier 14 with increasing distance s between the sensor and the surface of the test object in the presence of a torque when the resonant circuit is tuned and the phase position of the control voltage of the phase rectifier 14 differs from the phase position of the induced measuring voltage which forms the input to phase rectifier 14.

In the case of a phase angle $\zeta = 0°$ of the control voltage the phase rectifier 14, the signal voltage B has a distance independence when the shaft—sensor distances s are very small. With a phase angle $\zeta = 25°$, the signal voltage B obtained at the distance s=0 decreases to a small extent, but increases slightly as the distance s increases, covers a relatively broad maximum area and then slowly drops. The maximum occurs at approximately 0.7 mm distance. With a phase angle $\zeta = 45°$, the maximum area is from approximately 0.5 to 1.5 mm in which the measuring signal B changes by less than 5%. The maximum lies at a distance s of approximately 1 mm.

Accordingly, the area with the most favorable distance independence can be varied through the phase angle of the control voltage of the phase rectifier 14. The position is also co-determined by the exciting frequency relative to the resonance frequency of the series oscillatory circuit 11, 18.

Figure 4:
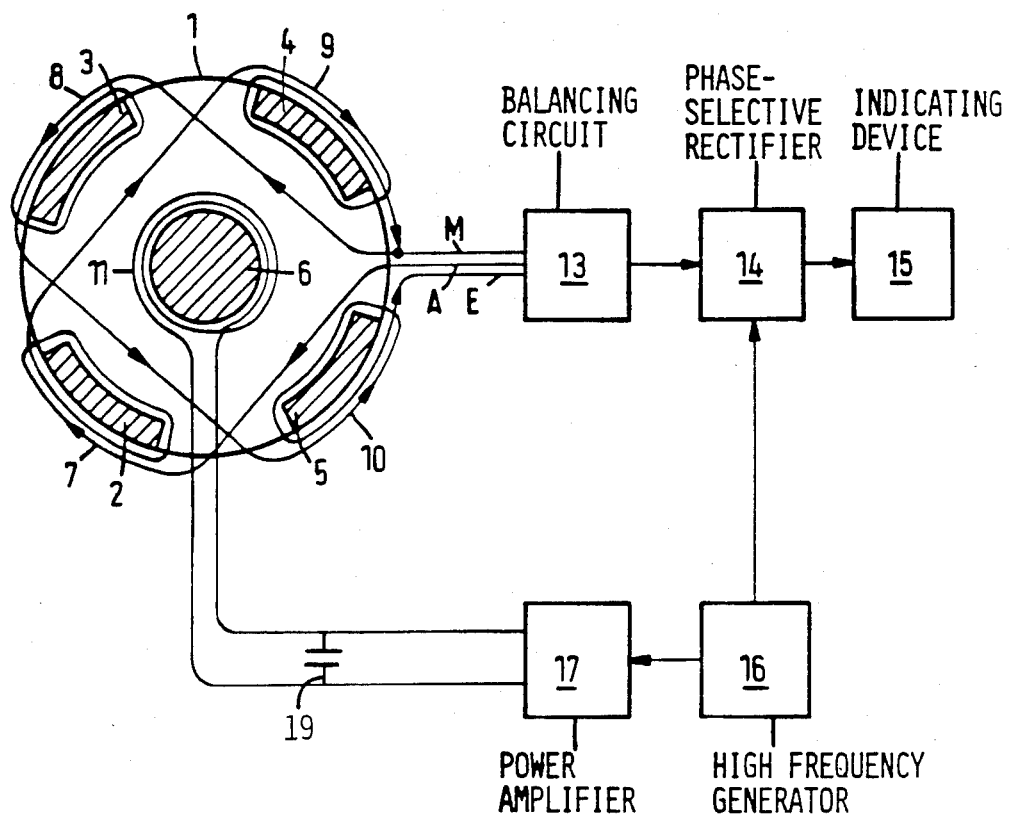
FIG. 4 shows the measuring windings of the torque sensor of FIG. 1 and an electronic measuring circuit connected thereto according to another embodiment of the invention.

Instead of forming a series oscillatory circuit using the exciting winding 11 and series connected capacitor 18, the exciting winding 11 can also be part of a parallel oscillatory circuit, as shown in FIG. 4, which has an alternating current of constant amplitude imparted to it. Referring to FIG. 4, such a parallel oscillatory circuit is constituted by a capacitor 19 connected in parallel with exciting winding 11. Otherwise the circuit of FIG. 4 corresponds to the circuit of FIG. 3. The voltage present at the parallel oscillatory circuit then changes with the changing quality (Q) of the resonant circuit which again is determined by the distance between the shaft and the sensor. As the measuring distance increases, the quality increases and with it also the voltage decrease at the exciting winding 11.

Accordingly, in rough approximation, when the exciting winding 11 is used together with a capacitor to form a resonant oscillatory circuit tuned to the frequency of the generator 16, there is a linear connection between the voltage decrease at the exciting winding and the distance of the torque sensor from the shaft 12.

By means of a correspondingly large exciting amplitude, the material of the shaft 12 is magnetized to saturation throughout the entire surface of the pot core 1 and thus through all four yoke segments 2 to 5 to the same extent; in this case, the magnetic field lines extend from the inside core 6 over the surface of the shaft 12, the yoke segments 2 to 5 and to the inside core 6 again. The reduced eddy currents in the surface of the shaft 12 limit the extent of the field lines to a certain penetration depth into the shaft surface. By magnetizing the shaft 12 to saturation, a hysteresis occurring in the measuring signal as the torque increases and decreases again, is eliminated.

I claim:

1. A torque sensor arrangement for the non-contacting measurement of static and dynamic torques produced in a test object, such torques causing a permeability change in the surface of the test object, comprising:
    a signal generator for producing an exciting signal having a predetermined exciting frequency;
    a pot-shaped magnetic yoke constituting a probe, said yoke having an edge and four pole members located at said edge, each said pole member having a pole surface opposite the surface of the test object;
    a plurality of measuring windings each supported by a respective one of said pole members, said measuring windings being connected to form a magnetic bridge and producing a measuring signal at an output of said bridge;
    an exciting winding connected to said signal generator and supported by said yoke for reversing the magnetization of the test object to saturation; and
    a capacitor connected to said exciting winding to form with said exciting winding a resonant oscillatory circuit tuned to the exciting frequency.

2. Arrangement as defined in claim 1, wherein said exciting winding and said capacitor are connected in series and form a series resonant oscillatory circuit.

3. Arrangement as defined in claim 1, wherein said exciting winding and said capacitor are connected in parallel and form a parallel resonant oscillatory circuit.

4. Arrangement as defined in claim 1, wherein the exciting signal is an exciting voltage, the measuring signal is a measuring voltage and further comprising a phase-selective rectifier connected to said signal generator for receiving and being controlled by the exciting voltage, said phase-selective rectifier further being connected to receive the measuring voltage.

5. Arrangement as defined in claim 4, wherein the measuring voltage is substantially independent of distance between the test object and said probe over a given distance range, the given distance range being controlled by the phase angle of the exciting voltage received by said phase-selective rectifier.

* * * * *